(12) United States Patent
Suetterlin et al.

(10) Patent No.: US 12,055,133 B2
(45) Date of Patent: Aug. 6, 2024

(54) METHOD FOR ADJUSTING THE VOLUMETRIC FLOW RATIO OF AT LEAST TWO DIFFERENT FLUIDS

(71) Applicant: COVESTRO INTELLECTUAL PROPERTY GMBH & CO. KG, Leverkusen (DE)

(72) Inventors: Jan Suetterlin, Cologne (DE); Andy Honour, Amersham (GB); Jeff Motley, Biggleswade (GB)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 534 days.

(21) Appl. No.: 17/283,008

(22) PCT Filed: Sep. 24, 2019

(86) PCT No.: PCT/EP2019/075636
§ 371 (c)(1),
(2) Date: Apr. 5, 2021

(87) PCT Pub. No.: WO2020/069906
PCT Pub. Date: Apr. 9, 2020

(65) Prior Publication Data
US 2021/0340965 A1 Nov. 4, 2021

(30) Foreign Application Priority Data

Oct. 5, 2018 (EP) ..................................... 18198951

(51) Int. Cl.
*F04B 13/02* (2006.01)
*G01F 13/00* (2006.01)
(Continued)

(52) U.S. Cl.
CPC .............. *F04B 13/02* (2013.01); *G01F 13/00* (2013.01); *G05D 11/005* (2013.01); *G05D 11/03* (2013.01)

(58) Field of Classification Search
CPC ...... G01F 13/00; G05D 11/005; G05D 11/03; F04B 13/02
See application file for complete search history.

(56) References Cited

U.S. PATENT DOCUMENTS 1,936,538 A * 11/1933 Borden .................. G05D 11/03
137/3
2,564,306 A * 8/1951 Isreeli .................. G05D 11/132
137/500
(Continued)

FOREIGN PATENT DOCUMENTS

EP 0503996 A1 * 9/1992 ......... G01N 33/0018
EP 1795988 A1 * 6/2007 ................ F04C 2/18
(Continued)

OTHER PUBLICATIONS

International Preliminary Report on Patentability received for PCT Patent Application No. PCT/EP2019/075636, mailed on Apr. 15, 2021, 12 pages.
(Continued)

*Primary Examiner* — Umashankar Venkatesan
(74) *Attorney, Agent, or Firm* — The Webb Law Firm (57) ABSTRACT

Method for adjusting the volumetric flow ratio of at least two different fluids (F1, F2) with a control-device. The control-device comprises a first chamber with a chamber-volume ($V_{C1}$) for the first fluid (F1) and an inlet-element and an outlet-element for the first fluid (F1) and at least one rotating or nutating element. The control-device further comprises at least one second chamber with a chamber-volume ($V_{C2}$) for the second fluid (F2), wherein the second chamber has an inlet-element and an outlet-element for the second fluid (F2)

(Continued)

and at least one rotating or nutating element. The rotating or nutating elements are coupled so as to rotate or nutate at a defined rotational or nutational frequency ratio and are driven by the fluids (F1, F2). The chamber volume ratio ($V_{C1}:V_{C2}$) and the rotational or nutational frequency ratio are selected such that the fluids (F1, F2) flowing out of the outlet-elements have a predefined volumetric flow ratio. The input resistor ($R_i$) of the respective inlet-element and the output resistor ($R_o$) of the respective outlet-element of the first chamber and/or the second chamber are chosen so as to satisfy the equation: (I), wherein $\eta_F$ is the viscosity of the respective fluid (F1, F2) and Cn designates the respective chamber.

16 Claims, 2 Drawing Sheets

(51) Int. Cl.
   *G05D 11/00* (2006.01)
   *G05D 11/03* (2006.01)

(56) References Cited

U.S. PATENT DOCUMENTS

| | | | | |
|---|---|---|---|---|
| 3,575,145 A | * | 4/1971 | Steiger | F02D 41/3809 137/101.21 |
| 3,821,963 A | * | 7/1974 | Olson | F04B 13/02 137/99 |
| 4,511,378 A | * | 4/1985 | Greene | F04C 11/003 417/362 |
| 5,588,088 A | * | 12/1996 | Flaman | F24D 17/00 126/362.1 |
| 6,762,213 B2 | * | 7/2004 | Lejeune | C12N 11/093 435/182 |
| 10,330,023 B2 | * | 6/2019 | Selstad | G01F 13/00 |
| 2008/0087336 A1 | | 4/2008 | Yasuda et al. | |
| 2010/0288381 A1 | * | 11/2010 | Durr | F04B 13/02 137/565.01 |
| 2011/0036416 A1 | * | 2/2011 | Leskinen | G05D 11/003 137/98 |

FOREIGN PATENT DOCUMENTS

| | | |
|---|---|---|
| EP | 2760903 A1 | 8/2014 |
| EP | 3012452 A1 | 4/2016 |
| WO | 2013/045406 A1 | 4/2013 |

OTHER PUBLICATIONS

International Search Report and Written Opinion received for PCT Patent Application No. PCT/EP2019/075636, mailed on Nov. 27, 2019, 13 pages.

* cited by examiner

METHOD FOR ADJUSTING THE VOLUMETRIC FLOW RATIO OF AT LEAST TWO DIFFERENT FLUIDS

CROSS-REFERENCE TO RELATED APPLICATIONS

This application is a national stage application (under 35 U.S.C. § 371) of PCT/EP2019/075636, filed Sep. 24, 2019, which claims benefit of European Application No. 18198951.8, filed Oct. 5, 2018, both of which are incorporated herein by reference in their entirety.

The invention relates to a method for adjusting the volumetric flow ratio of at least two different fluids (F1, F2). The volumetric flow ratio between the fluids (F1, F2) is adjusted with a control-device. The control-device comprises a first chamber with an inlet-element and an outlet-element for the first fluid (F1) and a second chamber with an inlet-element and an outlet-element for the at least one second fluid (F2). The subject-matter of the invention is also a control-device for adjusting the volumetric flow ratio of at least two different fluids (F1, F2).

Methods and devices of the above-mentioned type are known from practice in various embodiments. However, with the methods and devices known from practice, a satisfactory flow control between the fluids is often not possible. This leads to the problem that a fixed stoichiometric ratio between the fluid flows usually cannot be ensured with the solutions known from practice. In addition, the known measures often require external power sources, pumps or complex mechanical arrangements and are therefore expensive regarding their costs of purchase as well as their operating costs. The fact that a reliable flow control, i.e. a precise adjustment of the volumetric flow ratio between the fluids, is not possible in a satisfactory manner with the methods and devices known from practice, is especially important in a situation when two fluids undergo a fast chemical reaction with each other upon mixing. For these systems, it is of particular importance to precisely control the stoichiometric ratio between the fluids in the moment they are mixed independently of variations of the initial pressures and/or initial flow rates. However, with the methods and devices known from practice, a functionally-safe adjustment of the volumetric flow ratio between at least two different fluids is not possible. Especially the requirements concerning a situation in which the fluid flows undergo a chemical reaction with each other upon mixing are not met by the known measures.

Accordingly, it is an object of the present invention to provide a method for adjusting the volumetric flow ratio of at least two different fluids which reliably ensures a precise adjustment of the volumetric flow ratio between the fluids even if the requirements in connection with the flow control are very high, for example in case that the two fluid flows undergo a fast chemical reaction with each other upon mixing. Furthermore, it is an object of the present invention to provide a corresponding device for adjusting the volumetric flow ratio of at least two different fluids.

To attain the object, the invention teaches a method for adjusting the volumetric flow ratio of at least two different fluids (F1, F2), wherein the volumetric flow ratio between the fluids (F1, F2) is adjusted with a control-device, comprising a first chamber with a chamber volume ($V_{C1}$) for the first fluid (F1), wherein the first chamber has an inlet-element and an outlet-element for the first fluid (F1) and at least one rotating or nutating element inside the chamber, at least one second chamber with a chamber volume ($V_{C2}$) for the at least one second fluid (F2), wherein the second chamber has an inlet-element and an outlet-element for the second fluid (F2) and at least one rotating or nutating element inside the chamber, wherein the at least one rotating or nutating element of the first chamber and the at least one rotating or nutating element of the second chamber are coupled so as to rotate or nutate at a defined rotational or nutational frequency ratio, wherein the at least one rotating or nutating element of the first chamber and/or the at least one rotating or nutating element of the second chamber are/is driven by the first fluid (F1) and/or the second fluid (F2), wherein the chamber volume ratio ($V_{C1}:V_{C2}$) and the rotational or nutational frequency ratio are selected such that the first fluid (F1) flowing out of the outlet-element of the first chamber and the second fluid (F2) flowing out of the outlet-element of the second chamber have a predefined volumetric flow ratio and wherein the input resistor ($R_i$) of the respective inlet-element and the output resistor ($R_o$) of the respective outlet-element of the first chamber and/or the second chamber are chosen so as to satisfy the equation:

$$\frac{R_{iCn} + R_{oCn}}{\eta_F} = R_T \leq 10^{14} \text{ m}^{-3},$$

wherein $\eta_F$ is the viscosity of the respective fluid (F1, F2) and Cn designates the respective chamber.

According to the method of the invention, the volumetric flow ratio of at least two different fluids (F1, F2) is adjusted. Preferably, the volumetric flow ratio of two different fluids (F1, F2) is adjusted and thus, the control-device which is used to adjust the volumetric flow ratio between the fluids (F1, F2) comprises advantageously two chambers. It is also possible that the control-device comprises a large number of chambers in order to precisely adjust the volumetric flow ratio between a large number of partly identical and partly different fluids. According to a preferred embodiment of the invention, the volumetric flow ratio of two different fluids (F1, F2) is adjusted by means of a control-device comprising two chambers.

The fluids which are used within the framework of the invention may be reactants, catalysts, inhibitors, color pigments, plasticizers, foaming agents, anti-foaming agents or other functional additives. In addition, at least one of the fluids may contain a propellant.

Within the scope of the invention, volumetric flow ratio particularly means the ratio of the volumetric flow rate of at least two different fluids (F1, F2). The volumetric flow rate of a fluid is the volume of fluid which passes per unit time. Furthermore, within the scope of the invention, rotational or nutational frequency ratio particularly means the ratio of the rotational or nutational frequency of the at least one rotating or nutating element inside the first chamber to the rotational or nutational frequency of the at least one rotating or nutating element inside the at least one second chamber. Within the framework of the invention, flow control or degree of flow control, respectively, means the relation between the achieved volumetric flow ratio and the desired volumetric flow ratio. A high flow control or a high degree of flow control accordingly means that the achieved volumetric flow ratio is close to the desired volumetric flow ratio or stoichiometric ratio of the fluid flows.

According to the invention, the at least one rotating or nutating element of the first chamber and the at least one rotating or nutating element of the second chamber are coupled so as to rotate or nutate at a defined rotational or nutational frequency ratio. Thus, a predefined volumetric flow ratio can be ensured by selecting a defined chamber volume ratio ($V_{C1}:V_{C2}$) as well as the rotational or nutational frequency ratio. In this way, a reliable and reproducible adjustment of the volumetric flow ratio between the first fluid (F1) and the at least one second fluid (F2) is possible.

According to the invention, the input resistor ($R_i$) of the respective inlet-element and the output resistor ($R_o$) of the respective outlet-element of the first chamber and/or the second chamber are chosen so as to satisfy the equation:

$$\frac{R_{iCn} + R_{oCn}}{\eta_F} = R_T \leq 10^{14} \text{ m}^{-3}.$$

Within the scope of the invention, input resistor ($R_i$) of the inlet-element or output resistor ($R_o$) of the outlet-element, respectively, means the flow resistance of the inlet-element or the outlet-element. The inlet-element and/or the outlet-element are preferably designed as lines and/or tubes and/or openings and/or passageways which passageways are located inside the control-device.

According to a preferred embodiment of the invention, the inlet-element and/or the outlet-element is designed as an inlet-line and/or an outlet-line, most preferably as an inlet-tube and/or an outlet-tube. The inlet-line and/or the outlet-line advantageously both comprise chamber-sided inlet-outlet-openings.

It is recommended that the inlet-element of the first and/or the second chamber is designed as at least one inlet-tube, preferably at least one circular inlet-tube or comprises at least one circular inlet-tube. It is also within the scope of the invention that a mixing unit is directly coupled to the control-device which comprises two chamber-sided openings, wherein one of the openings is connected to the first chamber and one of the openings is connected to the second chamber. In such a case, the passageway in the control-device which leads from the chamber to the respective opening of the mixing unit is preferably the outlet-element of the chamber. In an alternative embodiment, the outlet-element of the first and for the second chamber is designed as at least one outlet-line or comprises an outlet-line, preferably an outlet-tube which guides the fluids separately to a mixing unit.

The inlet- and/or the outlet-element may advantageously be composed of different single elements. These single elements may be lines, tubes, openings, valves or passageways which passageways are located inside the control-device. In case that an inlet- and/or outlet-element is composed of multiple single elements, the input resistor ($R_i$) or the output-resistor ($R_o$), respectively, is calculated as the sum of the single resistors. For example, the inlet-element and/or the outlet-element may be formed of two different circular tubes of different radiuses which are connected by a valve. In such a case, the input resistor ($R_i$) and/or the output resistor ($R_o$) corresponds to the sum of the single resistors which are formed by the different compounds, meaning the resistor of the first tube, the resistor of the valve and the resistor of the second tube, wherein resistor means the flow resistance. In case of a tube with circular cross section, the flow resistance or the resistor, respectively, is calculated according to the formula:

$$R = \frac{8 \cdot \eta_F \cdot L}{\pi \cdot r^4},$$

wherein $\eta_F$ is the viscosity of the fluid, L is the length of the tube and r is the radius of the circular cross section of the tube. In case of a tube with rectangular cross section, the flow resistance or the resistor, respectively, is calculated according to the formula:

$$R = \frac{12 \cdot \eta_F \cdot L}{h^3 \cdot w},$$

wherein $\eta_F$ is the viscosity of the fluid, L is the length of the tube, h is the height of the channel cross section and w is the width of the channel cross section and wherein h is smaller than w (h<w). A person skilled in the art would calculate the flow resistance or the resistor, respectively of tubes, valves and the like according to his technical knowledge without problems.

To calculate the $R_T$-value of a chamber, the input resistor ($R_i$) of this chamber and the output resistor ($R_o$) of the chamber are added and divided by the viscosity ($\eta_F$) of the respective fluid.

As mentioned above, the input resistor ($R_i$) and the output resistor ($R_o$) are calculated as the sum of the single resistors of the inlet-element or the outlet-element, respectively. Thus, to calculate the input resistor ($R_i$) of an inlet-element, preferably the sum of the single resistors of all elements which guide the fluid (F1, F2) from a fluid reservoir into the respective chamber, meaning lines, tubes, valves, openings and passageways inside the control-device have to be added. Accordingly, to calculate the output resistor ($R_o$) of an outlet-element, the single resistors of all elements which guide the fluid (F1, F2) from the respective chamber to an exit-point or to a mixing unit are preferably added, meaning lines, tubes, valves, openings or passageways inside the control-device.

Within the scope of the invention, $\eta_F$ is the viscosity of the respective fluid (F1, F2). The viscosity of a fluid is preferably determined at a shear rate of $50 \cdot s^{-1}$ at 23° C. The first chamber, the at least one second chamber, the rotating or nutating elements and elements for connection of the rotating elements may be made of any suitable material, such as metal or plastics. In particular, the first chamber, the at least second chamber, the rotating or nutating elements and elements for connection of the rotating elements may be made of stainless steel, aluminium, titanium, polyoxymethylene (POM), polycarbonate, polystyrene, acrylonitrile butadiene styrene colpolymer (ABS), polyamide 6, polyamide 6.6, polyamide 12, polyether etherketone (PEEK), polyethylene, polypropylene, polytetrafluoro-ethylene, polyethylene terephthalate, polybutylene terephthalate. It is preferred to choose material combinations that lead to low friction between the moving parts of the device. In this respect, materials containing friction modifiers like graphite, PTFE particles or silicone oils are especially preferred.

According to a preferred embodiment of the method according to the invention, the input resistor ($R_i$) of the respective inlet-element and the output resistor ($R_o$) of the respective outlet-element of the first chamber and/or the second chamber are chosen so that $R_T$ is $10^4$ m$^{-3}$ to $10^{14}$ m$^{-3}$, preferably $10^5$ m$^{-3}$ to $10^{12}$ m$^{-3}$ and more preferably $10^6$ m$^{-3}$ to $10^{11}$ m$^{-3}$. This embodiment is based on the discovery that by choosing the input and output resistors in such a way that the $R_T$-value is in the preferred range, a very high degree of flow control is possible. Surprisingly, a high flow control performance can be ensured in a functionally-safe manner by simply selecting the input resistor ($R_i$) and the output resistor ($R_o$) of the respective inlet-/outlet-element of the first chamber and/or the second chamber so that $R_T$ has the preferred values. In this range, the flow control performance is surprisingly high. Furthermore, with decreasing magnitude of the input resistor ($R_i$) and/or the output resistor ($R_o$), the degree of flow control improves. Thus, the invention is based on the discovery that the choice of the input and output resistors has a surprisingly high effect on the flow control performance.

According to the invention, the at least one rotating or nutating element of the first chamber and the at least one rotating or nutating element of the second chamber are coupled. An embodiment of the invention that is particularly recommended is characterized in that the at least one rotating or nutating element of the first chamber and the at least one rotating or nutating element of the second chamber are mechanically coupled, preferably by means of a common shaft or a gearing mechanism. In case of a common shaft, the defined rotational or nutational frequency ratio is preferably 1:1. In case of a gearing mechanism, any rotational or nutational frequency ratio may be provided. It is also within the scope of the invention, that the at least one rotating or nutating element of the first chamber and the at least one rotating or nutating element of the second chamber are magnetically coupled. Furthermore, combinations of these embodiments are possible.

A preferred embodiment of the invention is characterized in that the at least one rotating or nutating element of the first chamber and the at least one rotating or nutating element of the second chamber are coupled directly, preferably by means of a common shaft. The direct coupling by means of a common shaft allows for the rotation of the at least one rotating or nutating element of the first chamber and the at least one rotating or nutating element of the second chamber at an essentially identical rotational or nutational frequency, so that the volumetric flow ratio between the first fluid (F1) and the second fluid (F2) is essentially equal to the defined volume ratio of the first and the second chamber ($V_{C1}:V_{C2}$).

According to another preferred embodiment of the invention, the at least one rotating or nutating element of the first chamber and the at least one rotating or nutating element of the second chamber are driven by the first fluid (F1) and the second fluid (F2), respectively. Hence, no external power source is necessary and the method and the device according to the present invention are simple in terms of the number and complexity of their elements as well as their operating costs.

A highly recommended embodiment of the invention is characterized in that the first chamber and/or the second chamber have a first rotating element and a second counter-rotating element. Preferably, the rotational frequency ratio between the first rotating elements and/or the rotational frequency ratio between the second counter-rotating elements essentially equals 1. The special advantage of this embodiment comprising a first rotating element and a second counter-rotating element inside the first and/or the second chamber, preferably inside the first and the second chamber, is that the fluids (F1, F2) drive the elements by a positive displacement mechanism with low leakage around the rotating elements. According to a preferred embodiment, the first rotating element of the first chamber is directly and mechanically coupled to the first rotating element of the second chamber via a common shaft and/or the second counter-rotating element of the first chamber is directly and mechanically coupled to the second counter-rotating element of the second chamber via a common shaft. It is also within the scope of the invention that just the first rotating elements or just the second counter-rotating elements are directly and mechanically coupled via a common shaft.

One preferred embodiment of the invention is characterized in that the viscosity $\eta_F$ of the first fluid (F1) and/or of the second fluid (F2) is 0.5 mPa·s to 10,000 mPa·s, preferably 1.0 mPa·s to 5,000 mPa·s, more preferably 25 mPa·s to 2,500 mPa·s, still more preferably 50 mPa·s to 2,500 mPa·s and most preferably 100 mPa·s to 2,500 mPa·s. According to a very preferred embodiment of the invention, the viscosity $\eta_F$ of the first fluid (F1) and/or of the second fluid (F2) is 500 mPa·s to 2,500 mPa·s. The special advantage of this embodiment is that the combination of a selection of the $R_T$-values or the input/output resistors, respectively, with a viscosity of the first and/or the second fluid in the specified range leads to particularly positive results in connection with the achieved degree of flow control.

It is within the scope of the invention that the ratio of the chamber volume ($V_{C1}$) of the first chamber and the chamber volume ($V_{C2}$) of the second chamber is 1 to 100, preferably 1 to 20, more preferably 1 to 10, still more preferably 1 to 5 and most preferably 1 to 2.5. The ratio of the chamber volume can both be the ratio $V_{C1}:V_{C2}$ and $V_{C2}:V_{C1}$. Thus, the particular chamber volume ratio ($V_{C1}:V_{C2}$) is 0.01 to 100, preferably 0.05 to 20, more preferably 0.1 to 10, still more preferably 0.2 to 5 and most preferably 0.4 to 2.5. Within the framework of the invention, chamber volume particularly means the volume of the respective chamber without the assigned inlet-/outlet-elements.

Preferably, the rotating element of the first chamber and the rotating element of the second chamber—and most preferably also their respective counter-rotating elements—are driven by the first (F1) or the second fluid (F2), respectively. In such an embodiment, also the volume of the rotating elements and the counter-rotating elements is preferably dependent on the chamber volume and/or the chamber volume ratio. Advantageously, the volume ratio of the first and the second chamber ($V_{C1}:V_{C2}$) essentially equals the volume ratio of the at least one rotating or nutating element of the first chamber and the at least one rotating or nutating element of the second chamber.

A highly recommended embodiment of the method according to the invention is characterized in that the ratio of the pressure difference ($\Delta p_1$) between the inlet-element and the outlet-element of the first chamber and the pressure difference ($\Delta p_2$) between the inlet-element and the outlet-element of the second chamber is smaller than 1,500, preferably smaller than 1,000, more preferably smaller than 500 and most preferably smaller than 100. Ratio of the pressure difference ($\Delta p_1$) and the pressure difference ($\Delta p_2$) both means the ratio $\Delta p_1:\Delta p_2$ or $\Delta p_2:\Delta p_1$. Within the scope of the invention, pressure difference $\Delta p$ means the difference of the pressure of the fluid before entering the inlet-element of the respective chamber (for example the pressure of the fluid reservoir) minus the atmospheric pressure at the exit of the outlet-element. For example, if the fluid reservoir for supplying the fluid (F1, F2) has a pressure of 2 bar and the atmospheric pressure at the exit of the outlet-element is 1 bar, the resulting $\Delta p$ would equal to 1 bar. In a very preferred embodiment of the invention, the ratio of the pressure difference between the inlet-element and the outlet-element of the first chamber ($\Delta p_1$) and the pressure difference between the inlet-element and the outlet-element of the second chamber ($\Delta p_2$) is smaller than 200, preferably smaller than 100.

An embodiment of the invention that is particularly recommended is characterized in that the ratio of the $R_{T(C1)}$-value of the first chamber and the $R_{T(C2)}$-value of the second chamber is smaller than 1,500, preferably smaller than 1,000, more preferably smaller than 500. This ratio preferably covers the ratios $R_{T(C1)}$:$R_{T(C2)}$ as well as $R_{T(C2)}$:$R_{T(C1)}$.

It is within the scope of the invention that the first fluid (F1) and the second fluid (F2) are selected so as to chemically react upon mixing. Preferably, at least one of the fluids (F1, F2) comprises at least one polyurethane, more preferably a silane-terminated polyurethane. A preferred embodiment of the method according to the invention is characterized in that at least one of the fluids (F1, F2) comprises at least one buffer, preferably a phosphate-buffer and/or at least one carboxymethyl cellulose, preferably carboxymethyl cellulose sodium salt, and/or at least one surfactant, preferably from the class of polysorbates. For instance, the first fluid (F1) may be a mixture of an alkoxysilane-terminated polymer as disclosed in example 1 of EP 2 760 903 B1 and dimethylether and the second fluid (F2) may be an aqueous solution as disclosed in example 12 of EP 2 760 903 B1. Upon mixing the fluids (F1, F2), they preferably chemically react to yield a polymer foam. In such a case, where the two fluids (F1, F2) react to yield a polymer foam, it is especially important to ensure a fixed stoichiometric ratio between the fluid flows and to adjust the volumetric flow ratio between the first and the second fluid in a satisfactory manner. For this embodiment, the method and the device according to the invention yield surprisingly good results and a very high degree of flow control.

A preferred embodiment of the invention is characterized in that the ratio of the $R_{T(C1)}$-value of the first chamber to the leakage resistor ($R_{L(C1)}$) of the first chamber and/or the ratio of the $R_{T(C2)}$-value of the second chamber to the leakage resistor ($R_{L(C2)}$) of the second chamber is between $10^{-8}$ and $10^4$, preferably between $10^{-7}$ and $10^2$ and most preferably between $10^{-8}$ and $10^0$. In this regard, leakage resistor ($R_L$) preferably describes the resistance inside the chamber which is caused by leakages in connection with the at least one rotating or nutating element inside the respective chamber. For example, leakage pathways may be present between the chamber walls and the at least one rotating or nutating element of the chamber. In this regard, a high leakage resistor means that there are just small leakage pathways or no leakage pathways present. A low leakage resistor means that the influence of leakage pathways is high. This embodiment is based on the finding that the flow control improves with decreasing values of the ratio $R_T$:$R_L$. Thus, the flow control improves with higher leakage resistors ($R_L$) and furthermore with decreasing values of the ratio $R_T$:$R_L$. The leakage resistor of a particular chamber can be determined by fixing the at least one rotating or nutating element inside the chamber and by subsequently determining the total resistance of the chamber. The leakage resistance then equals to the difference between the total resistor and the sum of the input resistor ($R_i$) and the output resistor ($R_o$) of the respective chamber.

According to a particularly preferred embodiment of the invention, the ratio of the flow volume ratio without rotating or nutating elements ($FR_0$) to the theoretical flow volume ratio ($FR_T$) is between 0.01 and 100, preferably between 0.5 and 5, and most preferably between 0.9 and 1.1. The theoretical flow volume ratio ($FR_T$) is calculated according to the formula:

$$FR_T = \frac{V_{C1}}{V_{C2}} \cdot \frac{v_2}{v_1},$$

wherein $V_{C1}$, $V_{C2}$ is the chamber volume of the respective chamber and wherein $v_1$, $v_2$ is the rotational or nutional frequency of the at least one rotating or nutating element inside the first ($v_1$) or the second chamber ($v_2$), respectively. Flow volume ratio without rotating or nutating elements ($FR_0$) preferably means the flow volume ratio of the two chambers without any rotating or nutating elements inside the chambers. This flow volume ratio without rotating or nutating elements is calculated according to the formula:

$$FR_0 = \frac{\Delta p_1}{\Delta p_2} \cdot \frac{R_{i(C2)} + R_{o(C2)}}{R_{i(C1)} + R_{o(C1)}},$$

wherein $R_{i(C1)}$, $R_{i(C2)}$ is the input resistor of the respective chamber and wherein $R_{o(C1)}$, $R_{o(C2)}$ is the output resistor or the respective chamber.

This preferred embodiment is based on the finding that the flow control improves with a smaller deviation of $FR_0$ and the theoretical flow volume ratio ($FR_T$).

To attain the object, the invention also teaches a control-device for adjusting the volumetric flow ratio of at least two different fluids (F1, F2)—especially with a method according to the above-described type—comprising:
a first chamber with a chamber volume ($V_{C1}$) for the first fluid (F1), wherein the first chamber has an inlet-element and an outlet-element for the first fluid (F1) and at least one rotating or nutating element inside the chamber,
at least one second chamber with a chamber volume ($V_{C2}$) for the at least one second fluid (F2), wherein the second chamber has an inlet-element and an outlet-element for the second fluid (F2) and at least one rotating or nutating element inside the chamber,
and wherein the at least one rotating or nutating element of the first chamber and the at least one rotating or nutating element of the second chamber are coupled so as to rotate or nutate at a defined rotational or nutational frequency ratio, wherein the at least one rotating or nutating element of the first chamber and/or the at least one rotating or nutating element of the second chamber are/is driven by the first fluid (F1) and/or the second fluid (F2).

According to one embodiment of the invention, the at least one rotating or nutating element of the first chamber and the at least one rotating or nutating element of the second chamber are mechanically coupled, preferably by means of a common shaft or a gearing mechanism. Most preferably, the rotating or nutating elements are directly coupled. According to a very preferred embodiment of the invention, the first chamber and/or the second chamber have a first rotating element and a second-counter rotating element. In connection with this embodiment, preferably, the first rotating element and the second counter-rotating element are preferably each gear-wheels, gearing into each other, wherein the gear-wheels are more preferably oval gear-wheels. It is recommended that the first rotating elements are directly and mechanically coupled via a common shaft and/or that the second counter-rotating elements are directly and mechanically coupled via a common shaft. It is also within the scope of the invention that the gear-wheels are of circular shape. In another embodiment, the rotating element is a rotary vane with retractable blades. Most preferably, the first rotating element and the second counter-rotating element are both oval gear-wheels, gearing into each other. The special advantage of this embodiment with oval-shaped gear-wheels is that the respective fluid (F1, F2) can drive the elements with low leakage around the rotating elements. Furthermore, no external drive and energy source is necessary for adjusting the volumetric flow ratio between the first fluid (F1) and the second fluid (F2).

According to a highly recommended embodiment, the device comprises at least one mixing unit, arranged at the outlet-element of the first chamber and the outlet-element of the second chamber in the direction of flow of the first fluid (F1) and the second fluid (F2). Preferably, the mixing unit is designed to mix the first fluid (F1) and the second fluid (F2) at the adjusted volumetric flow ratio and most preferably the mixing unit comprises at least one static mixer. In one embodiment, the outlet-element of the first and/or the second chamber is designed as an outlet-line, leading to the mixing unit where the two fluids (F1, F2) are mixed. In another preferred embodiment, the mixing unit is directly coupled to the device and comprises two chamber-sided openings which are connected to passageways inside the device which lead to the chambers and device defining the outlet-elements. As described above, the first fluid (F1) and the at least one second fluid (F2) are preferably selected so as to chemically react with each other upon mixing. In an embodiment, the viscosity of the mixture increases by a factor of at least 2 within 0.01 to 100 s after mixing. Within the framework of such an embodiment, the method and the device according to the invention are of high advantage because they ensure a fixed stoichiometric ratio and a high degree of flow control which is of special importance if the fluids are mixed with a mixing unit and if the viscosity of the mixture increases after mixing.

It is recommended that the inlet-element and/or the outlet-element of the first chamber and/or the inlet-element and/or the outlet-element of the second chamber are circular tubes. It is also within the scope of the invention that an inlet-element and/or an outlet-element is constructed of several aligned tubes or aligned circular tubes, respectively.

In another aspect, the invention relates to a dispensing module for dispensing at least two fluids (F1, F2) mixed with each other, comprising a reservoir for the first fluid (F1) connected to the inlet-element of the first chamber, a reservoir for the at least one second fluid (F2) connected to the inlet-element of the at least one second chamber, wherein the dispensing module furthermore comprises a control-device as above-described and in addition preferably comprises a dispensing nozzle to dispense the first fluid (F1) and the at least one second fluid (F2) mixed in the mixing unit which may be directly coupled to the control-device. In the dispensing module or in the mixing unit, respectively, the first fluid (F1) preferably reacts with the at least one second fluid (F2) after mixing. This reaction may yield a foam. In particular, the dispensing module may be used for a medical application, preferably for wound care. For instance, in the reservoir for the first fluid (F1), a reactive polymer may be arranged and in the second reservoir for the at least one second fluid (F2) a curing agent may be arranged. In operation of the dispensing module, the first fluid (F1) and the second fluid (F2) may be mixed in the mixing unit and dispensed via the dispensing nozzle on a wound in order to dress it by means of a foam produced in a chemical reaction between the first (F1) and the second fluid (F2).

The invention is based on the discovery that by means of the method according to the invention, the volumetric flow ratio between at least two different fluids (F1, F2) can be adjusted in a satisfactory manner to ensure a fixed stoichiometric ratio between the fluid flows. Surprisingly, especially the selection of the resistors of the inlet- and the outlet-elements of the chambers has a remarkable influence on the degree of flow control. With the method and the device according to the invention, it is possible to reliably ensure a precise adjustment of the volumetric flow ratio between at least two different fluids (F1, F2) in a functionally-safe and reproducible manner. It furthermore has to be noted that the adjustment of the volumetric flow ratio can be held constant over a long operation time and tolerates variations and changes in the system, for example pressure differences. Moreover, the method and the device according to the invention are characterized by a simple structure and simple measures which result in low operating costs as well as low costs of purchase. No external power sources are necessary and the success of the invention is achieved in a surprisingly easy but nevertheless functionally-safe manner.

The invention will now be explained below with reference to a drawing showing just one embodiment. In schematic diagrams.

Figure 1:
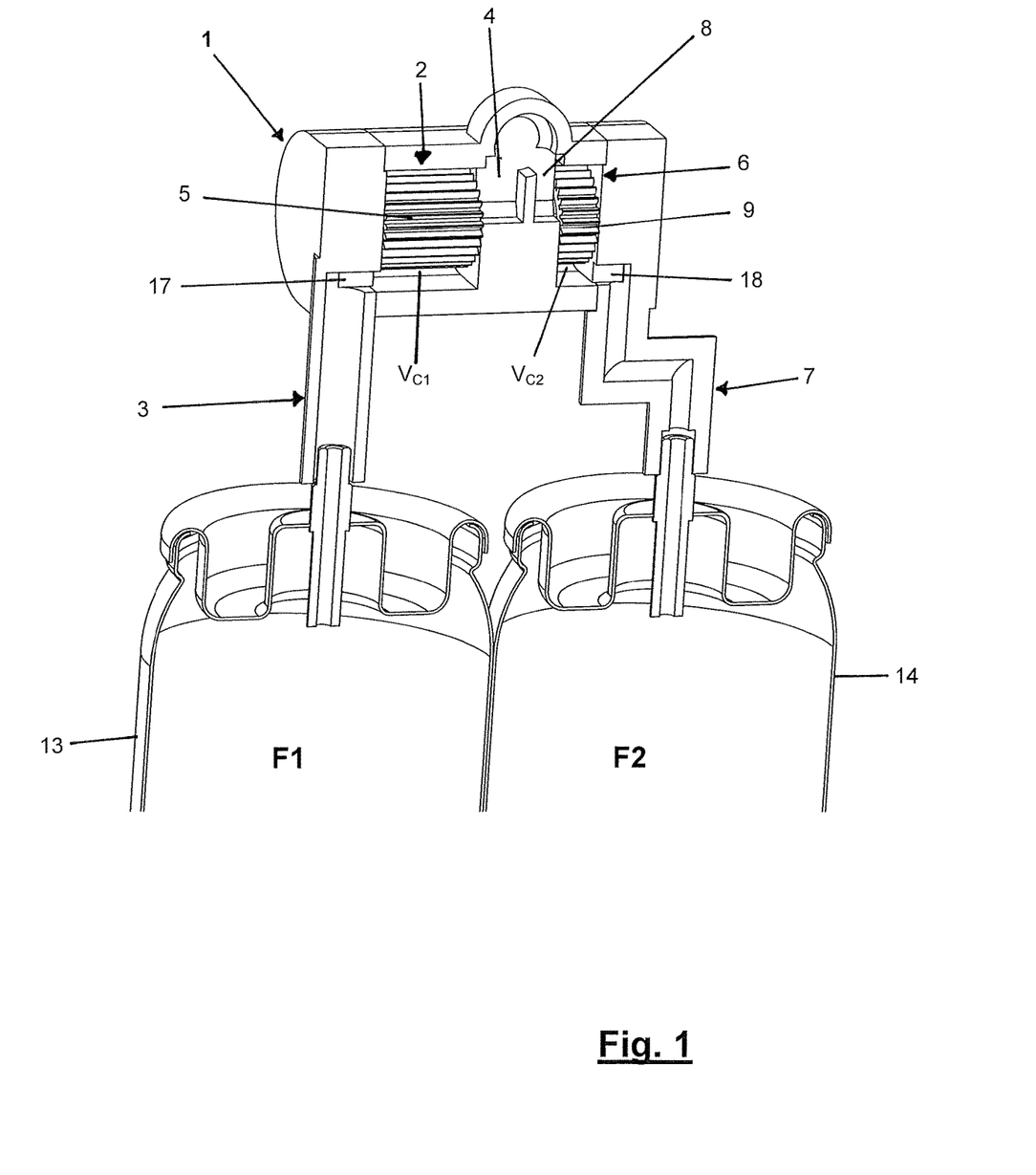
FIG. 1: A control-device according to the invention in a first longitudinal sectional view.
Figure 2:
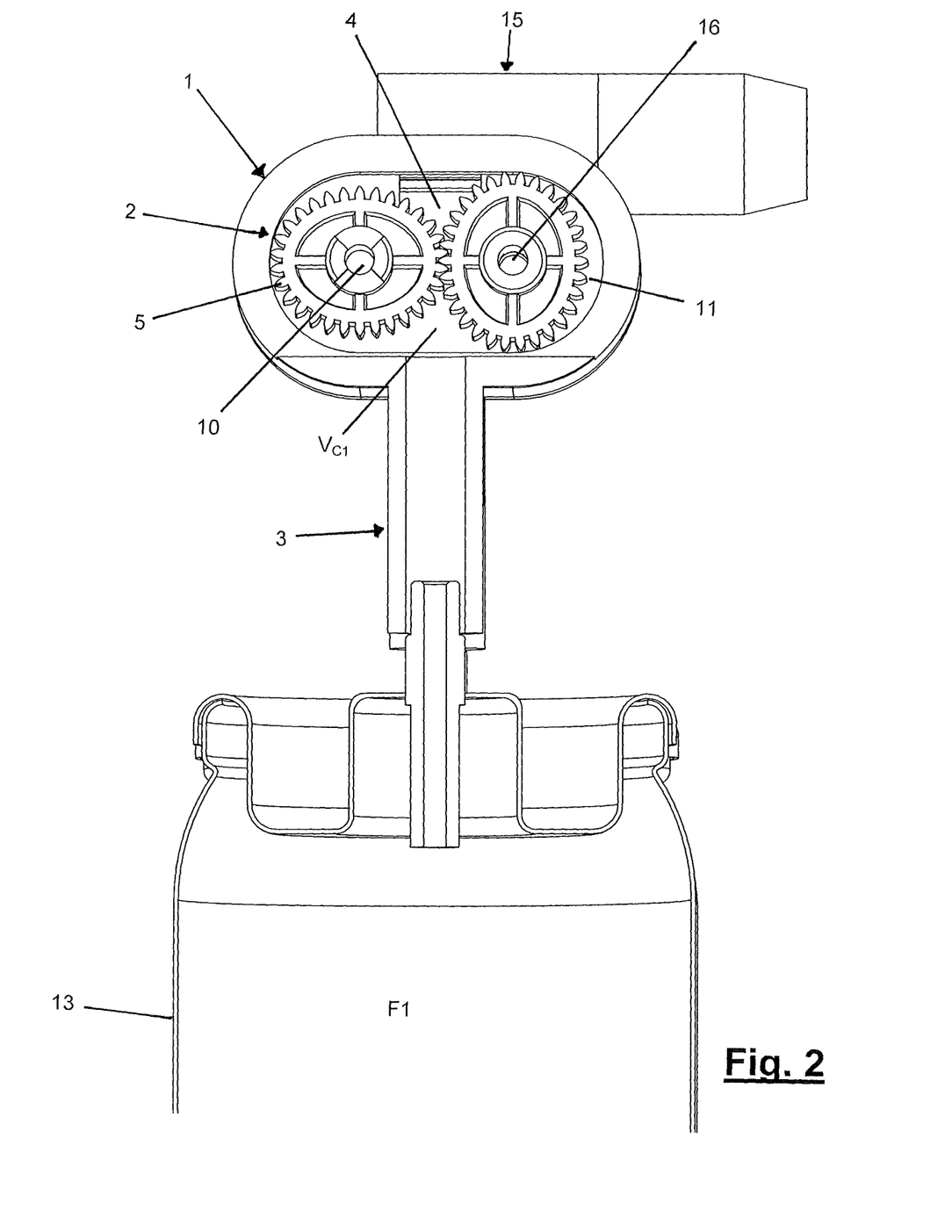
FIG. 2: the control-device of FIG. 1 in a second longitudinal sectional view.

The figures show a control-device 1 according to the invention for adjusting the volumetric flow ratio between a first fluid F1 and a second fluid F2. The control-device 1 comprises a first chamber 2 with a chamber volume $V_{C1}$ for the first fluid F1. This first chamber 2 has an inlet-element 3 and an outlet-element 4 for the first fluid F1. Preferably and according to the shown embodiment, the inlet-element 3 of the first chamber 2 is designed as a circular tube comprising a chamber-sided inlet-opening 17. In the embodiment of FIGS. 1 and 2, the outlet-element 4 of the first chamber 2 consists of a passageway inside the control-device 1 which is connected to a mixing unit 15. The mixing unit 15 is directly coupled to the control-device 1. Inside the first chamber 2, preferably and according to the shown embodiment, a rotating element 5 in the form of an oval gear-wheel is arranged.

The control-device 1 further comprises a second chamber 6 with a chamber volume $V_{C2}$ for the second fluid F2. The second chamber 6 has an inlet-element 7 and an outlet-element 8. According to the preferred embodiment, the inlet-element 7 is designed as an alignment of circular tubes. The inlet-element 7 further comprises a chamber-sided inlet-opening 18. In the embodiment of FIGS. 1 and 2, the outlet-element 8 of the second chamber 6 consists of a passageway inside the control-device 1 which is connected to a mixing unit 15. Inside the second chamber 6, a rotating element 9 in the form of an oval gear is arranged.

The preferred embodiment of FIGS. 1 and 2 furthermore shows that two fluid reservoirs 13, 14 for the first fluid F1 and the second fluid F2 are provided, which are connected to the respective inlet-elements 3, 7. The chamber volume $V_{C1}$ of the first chamber 2 and the chamber volume $V_{C2}$ of the second chamber 6 have a defined volume ratio, presently $V_{C1}:V_{C2}$=approximately 2.5:1 (FIG. 1).

Moreover, preferably and according to the embodiment of the figures, the first chamber 2 and the second chamber 6 of the control-device 1 each have a first rotating element 5, 9 and a second counter-rotating element 11, 12. According to the preferred embodiment, the first rotating elements 5, 9 and the second counter-rotating elements 11, 12 of the two chambers 2, 6 are each embodied as oval gear-wheels gearing into each other as can be best seen in the sectional view of FIG. 2 showing the first rotating element 5 and the second counter-rotating element 11 of the first chamber 2. The second counter-rotating element 12 of the second chamber 6 is not shown in the figures. The rotating elements 5, 11 of the first chamber 2 and the rotating elements 9, 12 of the second chamber 6 are driven by the first fluid F1 and the second fluid F2, respectively. Accordingly, no external drive and energy source is needed for adjusting the volumetric flow ratio between the first fluid F1 and the second fluid F2.

According to the preferred embodiment of the figures, the first rotating element 5 of the first chamber 2 is directly and mechanically coupled to the first rotating element 9 of the second chamber 6 via a common shaft 10. More preferably and according to the embodiment, the second counter-rotating element 11 of the first chamber 2 is directly and mechanically coupled to the second counter-rotating element 12 of the second chamber 6 via a common shaft 16. In consequence, the first rotating elements 5, 9 of both chambers 2, 6 and the second counter-rotating elements 11, 12 each rotate at an essentially identical rotational frequency. Accordingly, the defined rotational frequency ratios between the first rotating elements 5, 9 and the second counter-rotating elements 11, 12, respectively, essentially each equal 1:1.

Preferably and in the embodiment according to FIGS. 1 and 2, the frequency ratios between the first rotating elements 5, 9 on the one hand and the second counter-rotating elements 11, 12 on the other hand are essentially identical. Thus, the volumetric flow ratio between the first fluid F1 and the second fluid F2 is essentially equal to the chamber volume ratio $V_{C1}:V_{C2}$. However, to achieve a high degree of flow control, according to the invention, the input resistor $R_i$ of the respective inlet-element 3, 7 and the output resistor $R_o$ of the respective outlet-element 4, 8 of the first chamber 2 and/or the second chamber 6 are chosen so as to satisfy the equation:

$$\frac{R_{iC1/2} + R_{oC1/2}}{\eta_F} = R_T \leq 10^{14} \text{ m}^{-3},$$

wherein $\eta_F$ is the viscosity of the respective fluid F1, F2.

Hence, with the control-device 1, it is possible to easily adjust the volumetric flow ratio between the first fluid F1 and the second fluid F2 in a reliable and reproducible manner without the need for an external power source. In the present case, according to the embodiment, the volumetric flow ratio between the first fluid F1 and the second fluid F2 equals approximately 2.5:1.

Moreover, in a preferred embodiment which is shown in FIG. 2, the control-device 1 comprises a mixing unit 15 which is directly coupled to the control-device 1 and is connected to the outlet-element 4 of the first chamber 2 and the outlet-element 8 of the second chamber 6. The mixing unit 15 is designed to mix the first fluid F1 with the second fluid F2 at the adjusted volumetric flow ratio.

The first fluid F1 may be a mixture of an alkoxysilane-terminated polymer as disclosed in example 1 of EP 2 760 903 B1 and dimethylether and the second fluid F2 may be an aqueous solution as disclosed in example 12 of EP 2 760 903 B1. Upon mixing the fluids F1, F2, they chemically react to yield a polymer foam.

The invention claimed is:

1. A method for adjusting the volumetric flow ratio of at least two different fluids F1, F2, wherein the volumetric flow ratio between the fluids F1, F2 is adjusted with a control-device, comprising
   a first chamber with a chamber-volume $V_{C1}$ for the first fluid F1, wherein the first chamber has an inlet-element and an outlet-element for the first fluid and at least one rotating or nutating element inside the chamber,
   at least one second chamber with a chamber-volume $V_{C2}$ for the at least one second fluid F2, wherein the second chamber has an inlet-element and an outlet-element for the second fluid and at least one rotating or nutating element inside the chamber,
   wherein the at least one rotating or nutating element of the first chamber and the at least one rotating or nutating element of the second chamber are coupled so as to rotate or nutate at a defined rotational or nutational frequency ratio,
   wherein the at least one rotating or nutating element of the first chamber or the at least one rotating or nutating element of the second chamber are/is driven by the first fluid F1 and/or the second fluid F2,
   wherein the chamber volume ratio VC1:VC2 and the rotational or nutational frequency ratio are selected such that the first fluid flowing out of the outlet-element of the first chamber and the second fluid flowing out of the outlet-element of the second chamber have a predefined volumetric flow ratio
   and wherein the input resistor $R_i$ of the respective inlet-element and the output resistor $R_o$ of the respective outlet-element of the first chamber and/or the second chamber are chosen so as to satisfy the equation:

$$\frac{R_{iCn} + R_{oCn}}{\eta_F} = R_T \leq 10^{14} \text{ m}^{-3},$$

wherein $\eta_F$ is the viscosity of the respective fluid F1, F2 and Cn designates the respective chamber.

2. The method according to claim 1 wherein the input resistor $R_i$ of the respective inlet-element and the output resistor $R_o$ of the respective outlet-element of the first chamber and/or the second chamber are chosen so that $R_T$ is $10^4$ m$^{-3}$ to $10^{14}$ m$^{-3}$.

3. The method according to claim 1, wherein the at least one rotating or nutating element of the first chamber and the at least one rotating or nutating element of the second chamber are coupled directly so as to rotate at an identical rotational or nutational frequency, so that the volumetric flow ratio between the first fluid and the second fluid is equal to the defined volume ratio of the first and the second chamber $V_{C1}:V_{C2}$.

4. The method according to claim 1, wherein the first chamber and/or the second chamber have a first rotating element and a second counter-rotating element wherein the rotational frequency ratio between the first rotating elements and/or the rotational frequency ratio between the second counter-rotating elements equals 1.

5. The method according to claim 1, wherein the viscosity n of the first fluid F1 and/or of the second fluid F2 is 0.5 mPa·s to 10,000 mPa·s.

6. The method according to claim 1, wherein the ratio of the chamber volume $V_{C1}$ of the first chamber and the chamber volume $V_{C2}$ of the second chamber is 1 to 100.

7. The method according to claim 1, wherein the ratio of the pressure difference $\Delta p_1$ between the inlet-element and the outlet-element of the first chamber and the pressure difference $\Delta p_2$ between the inlet-element and the outlet-element of the second chamber is less than 1500.

8. The method according to claim 1, wherein the ratio of the $R_{T(C1)}$-value of the first chamber and the $R_{T(C2)}$-value of the second chamber is less than 1500.

9. The method according to claim 1, wherein the first fluid F1 and the second fluid F2 are selected so as to chemically react upon mixing and wherein at least one of the fluids F1, F2 comprises at least one polyurethane.

10. The method according to claim 1, wherein at least one of the fluids F1, F2 comprises at least one buffer.

11. The method according to claim 1, wherein the ratio of the $R_{T(C1)}$-value of the first chamber to the leakage-resistor $R_{L(C1)}$ of the first chamber and/or the ratio of the $R_{T(C2)}$-value of the second chamber to the leakage-resistor $R_{L(C2)}$) of the second chamber is between $10^{-8}$ and $10^4$.

12. The method according to claim 1, wherein the ratio of the flow volume ratio without rotating or nutating elements $FR_0$ to the theoretical flow volume ratio $FR_T$ is between 0.01 and 100.

13. A control-device for adjusting the volumetric flow ratio of at least two different fluids F1, F2 comprising:
a first chamber with a chamber volume $V_{C1}$ for the first fluid F1, wherein the first chamber has an inlet-element and an outlet-element for the first fluid F1 and at least one rotating or nutating element inside the chamber,
at least one second chamber with a chamber-volume $V_{C2}$ for the at least one second fluid F2, wherein the second chamber has an inlet-element and an outlet-element for the second fluid F2 and at least one rotating or nutating element inside the chamber, and wherein the at least one rotating or nutating element of the first chamber and the at least one rotating or nutating element of the second chamber are coupled so as to rotate or nutate at a defined rotational or nutational frequency ratio,
wherein the at least one rotating or nutating element of the first chamber and/or the at least one rotating or nutating element of the second chamber are/is driven by the first fluid F1 and/or the second fluid F2,
wherein the chamber volume ratio VC1:VC2 and the rotational or nutational frequency ratio are selected such that the first fluid flowing out of the outlet-element of the first chamber and the second fluid flowing out of the outlet-element of the second chamber have a pre-defined volumetric flow ratio
and wherein the input resistor $R_i$ of the respective inlet-element and the output resistor $R_o$ of the respective outlet-element of the first chamber and/or the second chamber are chosen so as to satisfy the equation:

$$\frac{R_{iCn} + R_{oCn}}{\eta_F} = R_T \leq 10^{14} m^{-3},$$

wherein $\eta_F$ is the viscosity of the respective fluid F1, F2 and Cn designates the respective chamber.

14. The device according to claim 13 wherein the at least one rotating or nutating element of the first chamber and the at least one rotating or nutating element of the second chamber are mechanically coupled.

15. The device according to claim 13, wherein the first chamber and/or the second chamber have a first rotating element and a second counter-rotating element and wherein the first rotating element and the second counter-rotating element are each gear-wheels, gearing into each other.

16. The device according to claim 13, wherein the device comprises at least one mixing-unit, arranged at the outlet-element of the first chamber and the outlet-element of the second chamber in the direction of flow of the first fluid F1 and the second fluid F2, wherein the mixing-unit is designed to mix the first fluid F1 and the second fluid F2 at the adjusted volumetric flow ratio and wherein the mixing-unit comprises at least one static mixer.

* * * * *